(12) United States Patent
Boerlage et al.

(10) Patent No.: US 8,240,991 B2
(45) Date of Patent: Aug. 14, 2012

(54) METHOD AND SYSTEM FOR OPERATING A WIND TURBINE

(75) Inventors: Matthijs Leonardus Gerardus Boerlage, Munich (DE); Leonardo Cesar Kammer, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/167,332

(22) Filed: Jun. 23, 2011

(65) Prior Publication Data

US 2012/0027566 A1    Feb. 2, 2012

(51) Int. Cl.
F04D 27/00    (2006.01)

(52) U.S. Cl. .................. 416/1; 416/30; 416/35; 416/36; 416/41; 416/43; 416/44; 416/61; 416/89; 415/1; 415/4.1; 415/26; 415/48; 415/118

(58) Field of Classification Search ............... 415/1, 4.1, 415/26, 48, 49, 118; 416/1, 30, 31, 35, 36, 416/40, 41, 43, 44, 61, 89
See application file for complete search history.

(56) References Cited

U.S. PATENT DOCUMENTS

| | | | |
|---|---|---|---|
| 6,361,275 B1 * | 3/2002 | Wobben | 416/33 |
| 7,004,724 B2 | 2/2006 | Pierce et al. | |
| 7,160,083 B2 * | 1/2007 | Pierce et al. | 416/61 |
| 7,437,264 B2 * | 10/2008 | Pierce et al. | 702/151 |
| 7,569,944 B2 | 8/2009 | Oohara et al. | |
| 7,874,797 B2 * | 1/2011 | Pierce et al. | 416/1 |
| 8,020,455 B2 * | 9/2011 | Sihler et al. | 73/862.333 |
| 2004/0151584 A1 | 8/2004 | Blakemore | |
| 2009/0180875 A1 | 7/2009 | Egedal et al. | |

OTHER PUBLICATIONS

P. Novak, T. Ekelund, I. Jovik, B. Schmidtbauer; "Modeling and Control of Variable-Speed Wind-Turbine Drive-System Dynamics"; Control Systems Magazine, IEEE, Aug. 1995, vol. 15, Issue. 4 ,pp. 28-38.

F.Lescher, H. Camblong, R.Briand, R.O.Curea; "Alleviation of Wind Turbines Loads With a LQG Controller Associated to Intelligent Micro Sensors"; Industrial Technology, 2006. ICIT 2006. IEEE International Conference, Dec. 15-17, 2006, pp. 654-659.

C. Sloth, T. Esbensen, J.Stoustrup; "Active and Passive Fault-Tolerant LPV Control of Wind Turbines"; American Control Conference (ACC), Jun. 30, 2010-Jul. 2, 2010, pp. 4640-4646.

* cited by examiner

Primary Examiner — Igor Kershteyn
(74) Attorney, Agent, or Firm — Scott J. Asmus

(57) ABSTRACT

A method, system and computer program product for operating a wind turbine is disclosed. For operating the wind turbine a set of operational data points are sensed via a sensing module. The set of operational data points may include bending stress values. Based on the bending stress values, a load scenario indicator value may be computed. Further, based on the set of operational data points a loading threshold value may be obtained. At least one operating parameter of the wind turbine is changed if the load scenario indicator value exceeds the loading threshold.

17 Claims, 4 Drawing Sheets

METHOD AND SYSTEM FOR OPERATING A WIND TURBINE

BACKGROUND

Embodiments presented herein relate generally to a wind turbine, and more specifically relate to a system and a method for protection of a wind turbine against extreme load conditions.

A wind turbine typically includes a set of two or more turbine blades and a nacelle mounted on a pylon structure. The wind turbine is configured to tap the power of moving wind and convert it into kinetic energy of the rotating turbine blades. The wind turbine is also equipped with a torque transmission mechanism for transmitting a torque from the rotating turbine blades to a generator. The generator converts the transmitted torque into electrical energy. The generated electrical energy is typically fed to a power grid. Power electronic converters may be used to feed the power in a form compatible to the power grid. The generator and a control system may be installed in the nacelle of the wind turbine. Alternately, the control system may be installed remotely from the nacelle. A primary function of the control system is to control the operation of the wind turbine and to optimize the power generation therefrom.

Wind turbines are dependent on wind for their operation, and perform optimally at particular wind speeds. Wind speeds lower than a threshold value may result in very low power generation. Wind speeds higher than the threshold value may result in excessive stress and load on the turbine blades and as a result may damage the turbine blades. Turbine blade damage not only increases the cost of power production but also decreases the amount of power harnessed from the wind turbine. The damage caused to turbine blades may result in significant down time and may reduce the power generation potential of the wind turbine.

Generally, wind turbines may be put out of operation during extreme load conditions arising from high wind velocity. While this prevents turbine blade damage, such a strategy is unable to avoid the down-time arising from the wind turbine being shut-down.

There is a continued need for a system that not only protects the wind turbine during extreme loading conditions but also maintains some continuity of power generation.

BRIEF DESCRIPTION

According to an embodiment, a method of operating a wind turbine is provided. The method includes sensing a set of operational data points of the wind turbine wherein each data point in the set of operational data points comprises at least a bending stress value of a rotor shaft. Based on the bending stress values, a load scenario indicator value is computed. The method also includes estimating a loading threshold value based on the set of operational data points. The method further includes controlling the wind turbine so as to operate the wind turbine in a safe mode when the load scenario indicator value exceeds the loading threshold value.

According to another embodiment, a system for operating a wind turbine is provided. The system includes a sensor module for sensing a set of operational data points of the wind turbine, wherein each data point in the set of operational data points comprises at least a bending stress value of a rotor shaft of the wind turbine. Based on the bending stress values of the rotor shaft, a load scenario estimator may compute a load scenario indicator value. The system also includes a loading threshold estimator for estimating a loading threshold value based on the set of operational data points. The system may further include a protective module for controlling the wind turbine so as to operate the wind turbine in a safe mode when the load scenario indicator value exceeds the loading threshold value.

According to yet another embodiment a non-transitory computer readable media encoded with a program to enable a processor-based system to perform a computer aided operation of a wind turbine is provided. The program is configured to instruct the processor-based system to sense a set of operational data points of the wind turbine, wherein each data point in the set of operational data points comprises at least a bending stress value of a rotor shaft. The program may also instruct the processor based system to compute a load scenario indicator value based on the bending stress values of the rotor shaft. Further, the program may instruct the processor based system to estimate a loading threshold value based on the set of operational data points and control the wind turbine so as to operate the wind turbine in a safe mode when the load scenario indicator value exceeds the loading threshold value.

According to another embodiment a system is disclosed. The disclosed system includes a wind turbine including a plurality of turbine blades and a turbine generator coupled to the plurality of turbine blades via a gear system and a rotor shaft. The system also includes a system for operating the wind turbine. The system communicatively coupled to the wind turbine includes a sensor module for sensing a set of operational data points of the wind turbine, wherein each data point in the set of operational data points comprises at least a bending stress value of the rotor shaft of the wind turbine. Based on the bending stress values of the rotor shaft, a load scenario estimator may compute a load scenario indicator value. The system also includes a loading threshold estimator for estimating a loading threshold value based on the set of operational data points. The system may further include a protective module for controlling the wind turbine so as to operate the wind turbine in a safe mode when the load scenario indicator value exceeds the loading threshold value.

One or more embodiments offers technical benefits such as continuity of power generation, protection from an overload condition arising out of high wind speeds, and a method of operating the wind turbine in a safe mode particularly during overload conditions, thereby preventing damage to turbine blades while maintaining continuity of power generation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF EMBODIMENTS

Figure 1:
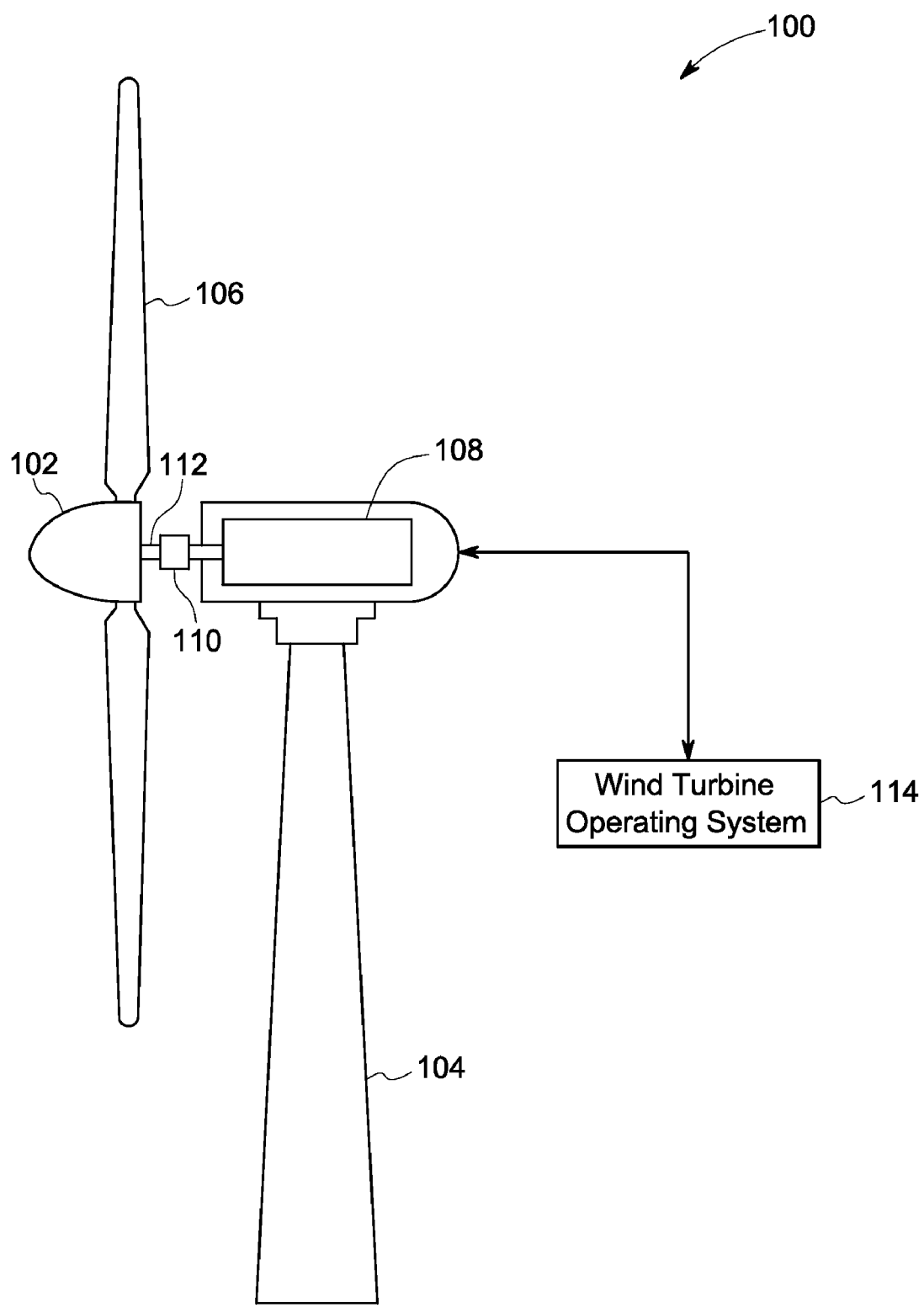
FIG. 1 illustrates an exemplary system according to one embodiment.

Embodiments presented herein include a system, method and computer program product for protecting a wind turbine under extreme load conditions. A system 100 according to one embodiment is illustrated in FIG. 1. The system 100 includes a wind turbine 102. The wind turbine 102 typically includes a pylon 104 over which a set of turbine blades 106 are mounted. The turbine blades 106 are coupled to an electric generator 108 hereinafter a turbine generator 108, either directly or via a torque transmission mechanism such as a gear train 110. The turbine blades 106 capture a kinetic energy of flowing wind and convert the kinetic energy into the rotatory motion of a rotor shaft 112 which is coupled to the turbine generator 108. The turbine generator 108 receives power from the rotor shaft 112 and converts it into electrical energy. The electrical energy generated is fed to a supply grid via a series of power electronic converters (not shown). In some examples, the power converters may aid in control of the power generation and operation of the wind turbine 102. The system 100 further comprises a system 114 for operating the wind turbine 102. The system 114 is coupled to the wind turbine 102. The system 114 is described in detail in connection with FIG. 2.

Wind turbines may be subject to high wind velocities both from sustained high winds and excessive wind gusts. High wind velocities may cause excessive stress loading on the turbine blades 106 that may ultimately damage the turbine blades 106. In one embodiment. the system 114 described herein protects the wind turbine 102 in high loading conditions by operating the wind turbine 102 in a "safe mode" of operation that permits some continued operation of electrical generation.

Figure 2:
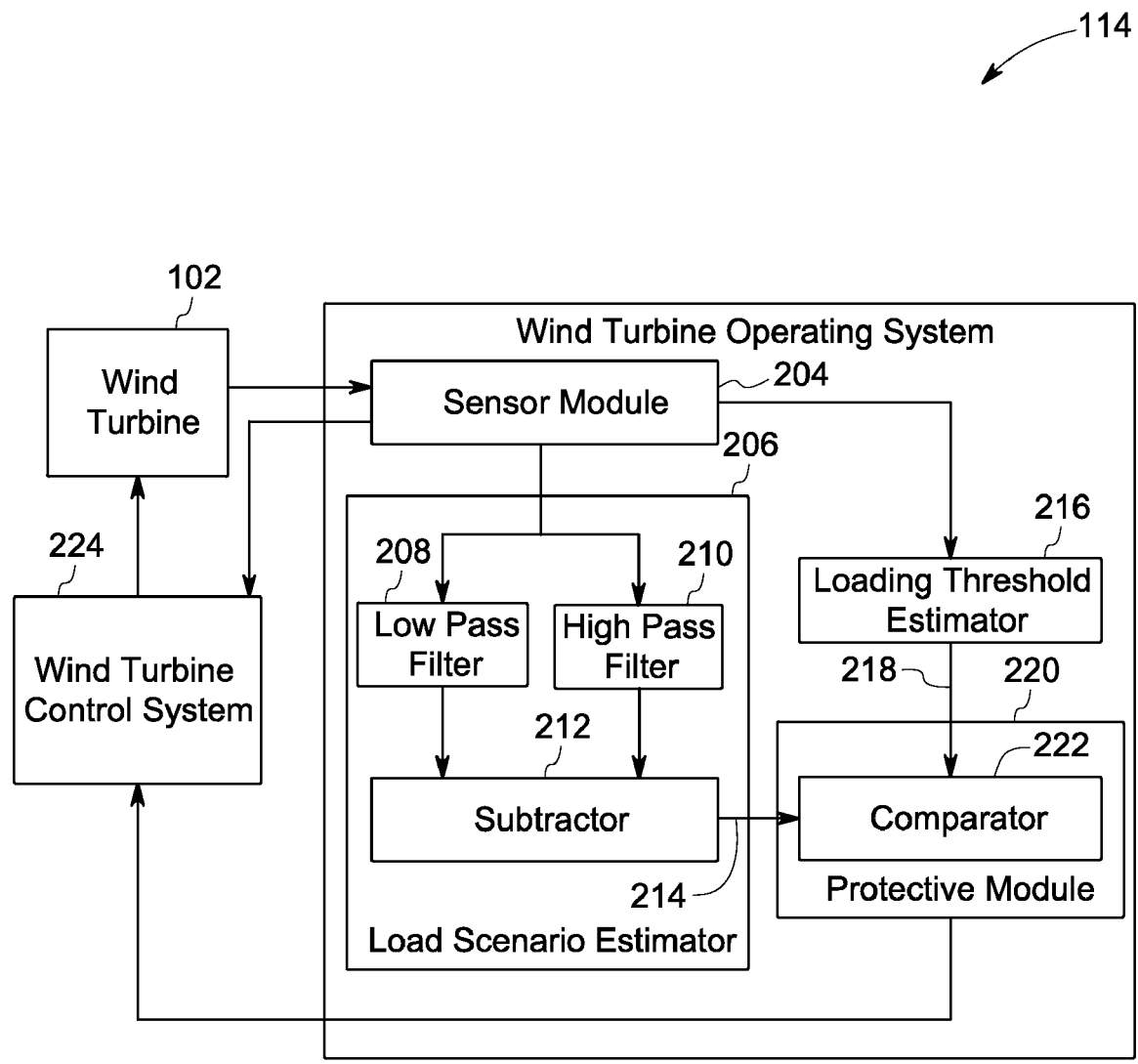
FIG. 2 illustrates a block diagram of an exemplary system for operating a wind turbine, according to one embodiment.

FIG. 2 depicts a block diagram of the exemplary system 114 for operating a wind turbine 102. Referring to FIG. 1 and FIG. 2, the system 114 includes a sensor module 204 for sensing one or more parameters associated with the operation of the wind turbine 102. The parameters sensed by the sensor module 204 may include torque on the rotor shaft, power generated by the wind turbine 102, rotational speed of the wind turbine 102, bending stress values of the rotor shaft 112, wind direction, wind speed, output voltage and output current of the turbine generator 108, pitch angle of the turbine blades 106, rotational speed of the turbine generator 108, a yaw of the wind turbine 102 and the like. It may be noted that the sensor module 204 may sense a set of operational data points, wherein a data point may have measured values of the one or more parameters mentioned above. In one embodiment, the set of operational data points may be obtained at predetermined time intervals over a time window. According to one example, the set of data points may be obtained every 0.1 seconds for a time window of 5 seconds. It should be appreciated that the number of data points, the interval time, and the time window can be established according to design criteria and application.

The sensor module 204 in one embodiment includes a plurality of sensors for measuring the set of operational data points associated with the operation of the wind turbine 102. In one embodiment, the sensor module 204 may include a proximity sensor for measuring the bending stress values of the rotor shaft 112. The sensor module 204 may further have sensors for measuring the power generated by the wind turbine 102, torque on the rotor shaft 112, wind speed, wind direction, rotational speed of the wind turbine 102, output voltage and output current of the turbine generator 108, rotational speed of the wind turbine 102, power generated and the like. The set of operational parameters may be useful in estimating a "load scenario indicator value" of the wind turbine 102. A load scenario indicator, in accordance with one embodiment is the measure of a high frequency pulsating load that the turbine blades 106 are subjected to.

A load scenario indicator value corresponding to the operation of the wind turbine 102 may be estimated by a load scenario estimator 206. In an embodiment, the load scenario estimator 206 computes a load scenario indicator value based on the bending stress values obtained from the sensor module 204. Each data point in the set of operational data points includes a bending stress value on the rotor shaft 112. The bending stress value corresponds to the bending stress that the rotor shaft 112 is subjected to due to aerodynamic imbalances in the turbine blades 106. Thus, measuring the bending stress on the rotor shaft 112 may be indicative of the aerodynamic loading of the turbine blades 106. In an embodiment, the bending stress values are obtained at predetermined time intervals over the fixed time window.

The load scenario estimator 206 in one example includes filters such as a low pass filter 208 and a high pass filter 210. The bending stress values obtained are passed through both the high pass filter 210 and the low pass filter 208 for obtaining a set of high pass filtered bending stress values and a set of low pass filtered bending stress values, respectively. The functioning of the low pass filter 208 and the high pass filter 210 are explained in further detail herein.

In this example, the output of both the high pass filter 210 for high pass filtered bending stress values and the output of the low pass filter 208 for low pass filtered bending stress values are fed to a subtractor 212. The subtractor 212 computes the load scenario indicator value 214 by computing the difference between the output of the high pass filter 210 and the low pass filter 208. It may be noted that the load scenario indicator value 214 is computed corresponding to one or more bending stress values obtained from the sensor module 204. The magnitude of the load scenario indicator value 214 provides an estimation of a high frequency pulsating load on the turbine blades. The magnitude of the load scenario indicator 206 is the difference between the set of high pass filtered bending stress values and the set of low pass filtered bending stress values. As noted herein, the bending stress of the rotor shaft 112 is typically indicative of the aerodynamic loading of turbine blades 106. The magnitude of the load scenario indicator 206 in one example indicates the high frequency pulsating load on the turbine blades.

It may be noted that the load scenario indicator value 214 provides an estimation of the high frequency pulsating load on the turbine blades 106, and may be obtained by a statistical model of the wind turbine 102. Such models may include models based on Kalman filter, Bayesian models and the like.

The system 114 further includes a loading threshold estimator 216. The loading threshold estimator 216 estimates a "loading threshold value" 218 based on the operating condition of the wind turbine 102. The "loading threshold value" 218 is indicative of the upper limit of high frequency pulsating load that the turbine blades can withstand without damage. The loading threshold value 218 may also depend on the elastic properties on the wind turbine material, the wind speed and the yaw error. It should be noted herein that yaw error refers to a relative angular difference between wind direction and nacelle orientation.

In an embodiment, the loading threshold value 218 may be obtained based on the yaw error and the wind speed. As noted herein, the bending stress on the rotor shaft may depend on wind speed and the yaw error. For example, high wind speeds may impose higher bending stress than low wind speeds. Also, winds incident normally on the turbine blades may cause higher loading than winds incident obliquely on the turbine blades. In one embodiment, the system 114 may store a lookup table consisting of loading threshold values for various wind speeds and various yaw errors. In other words, the lookup table includes a unique loading threshold value of a given wind speed and yaw error. Each entry into the lookup table may be estimated based on elastic properties of the turbine blade material. The loading threshold estimator 216 may obtain the loading threshold value 218 corresponding to the wind speed and yaw error. In an alternate embodiment, the loading threshold value 218 may be obtained dynamically based on the wind speed, yaw error and elastic properties of the turbine blade material. It may further be noted that the loading threshold value 218 is obtained based on the wind speeds obtained over a finite interval of time. Thus, the loading threshold value 218 represents the loading threshold for an average wind speed over the finite time interval. Thus, the loading threshold value 218 obtained will typically not be affected by momentary gusts and will reflect only sustained winds. In an embodiment, the finite time interval may be approximately 5 seconds. In an alternate embodiment, the finite time interval may vary between 5-20 seconds.

The system 114 may further include a protective module 220. The protective module 220 includes a comparator 222 configured to compare the load scenario indicator value 214 with the loading threshold value 218. As mentioned above, the load scenario indicator value 214 is the measure of the high frequency pulsating load and the loading threshold value 218 is the measure of the upper limit of the high frequency pulsating load. If the load scenario indicator value 214 exceeds the loading threshold value 218, it may be inferred that the wind turbine 102 may be loaded beyond a safe limit.

When the load scenario indicator value 214 exceeds the loading threshold value 218, the comparator 222 may send a signal to a wind turbine control system 224 indicating the presence of an overload condition. The wind turbine control system 224 is configured to control the operation of the wind turbine 102. Controlling the operation may include but is not limited to controlling the yaw of the wind turbine 102, the pitch of the turbine blades, controlling the power electronic converters connected to the turbine generator for controlling the power generated by the wind turbine 102, rotational speed, and torque of the wind turbine 102.

In an embodiment, the protective module 220 provides the indication of an overload that drives the wind turbine control system 224 to operate the wind turbine 102 in a safe mode. The safe mode of operation includes operating the wind turbine 102 such that the load scenario indicator value 214 in one example is lower than the loading threshold value 218. In an embodiment, the wind turbine control system 224 may change, for example, the pitch angle of the turbine blades. In an alternate embodiment, the wind turbine control system 224 may change the yaw of the wind turbine 102. Alternately, the wind turbine control system 224 may control the power electronic converters connected to the turbine generator for controlling at least one of the power generated by the wind turbine 102, rotational speed, and the torque of the wind turbine 102. In another embodiment, a combination of the one or more of the above parameters may be changed.

It may be appreciated by those skilled in the art that the system 114 shown in FIG. 1 is an exemplary embodiment, and other embodiments with different configurations may be envisioned. For example, in an embodiment, the wind turbine control system 224 may be merged with the protective module 220. In such an embodiment, the protective module 220 may also control the operation of the wind turbine 102 other than performing the function described in connection with FIG. 2. It may also be noted that the system 114 may include hardware components (not shown) which may enable the system to operate in a predefined manner. Such hardware components for example may include one or more processors, a display, a storing device including RAM, ROM or any other storing media, switch mode power supplies, other power converters and the like.

Figure 3:
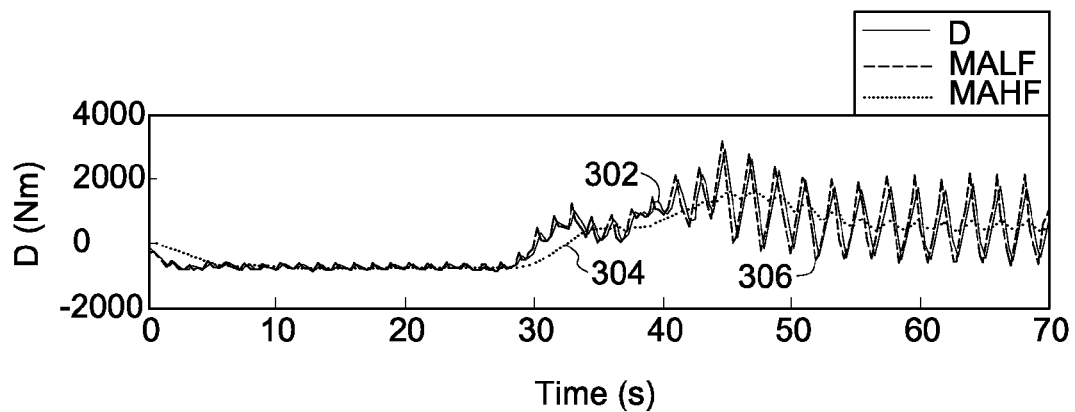
FIG. 3 is a plot illustrating variation of bending stress values, low pass filtered bending stress values and high pass filtered bending stress values with respect to time.

FIG. 3 is a graph illustrating variation of bending stress values (in Newton-meter) represented by Y-axis versus time (in second) represented by X-axis. FIG. 3 includes three curves 302, 304 and 306. Curve 302 is the plot of the measured bending stress values versus time. In other words, the curve 302 is the plot of actual bending stress against time. These bending stress values may be obtained from the sensor module from FIG. 1. FIG. 3 further includes the curve 304 which shows the plot of the set of low pass filtered bending stress values against time. The set of low pass filtered bending stress values may be obtained by passing the bending stress values through the low pass filter. It may be observed that the curve 304 is smoother than curve 302 as high frequency components in curve 304 are filtered out by the low pass filter. FIG. 3 further includes the curve 306 which is a plot of the set of high pass filtered bending stress values with respect to time. As mentioned above, the set of high pass filtered bending stress values are obtained by passing the bending stress values obtained from the sensor module through the high pass filter. It may be observed that the curve 306 closely matches the curve 302 showing that the high frequency components are retained while the bending stress values are passed through the high pass filter.

It may be noted that the plots shown in FIG. 3 are for the purpose of illustration and do not limit the scope of the teachings presented herein. Embodiments presented herein may operate without generating the plots shown in FIG. 3.

Figure 4:
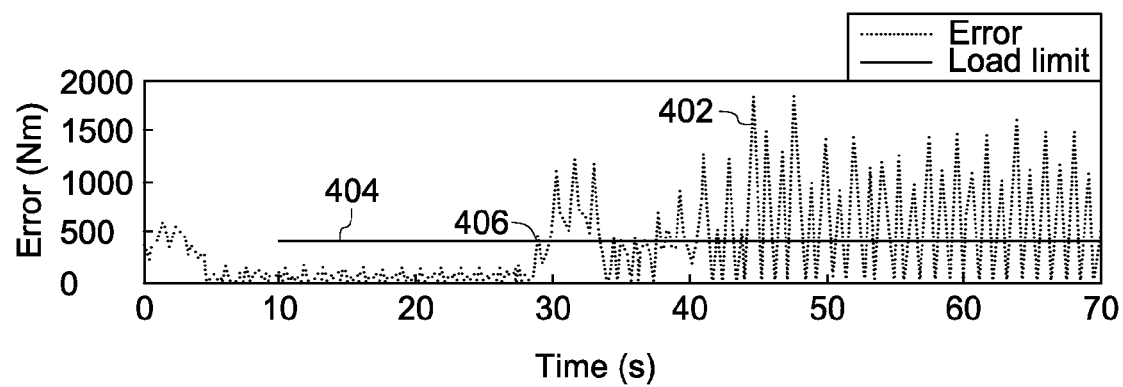
FIG. 4 is a plot illustrating variation of a load scenario indicator and a loading threshold with respect to time.

The comparison of the load scenario indicator value with the loading threshold value in illustrated in FIG. 4. FIG. 4 illustrates curves 402 and 404. The curve 402 illustrates the variation the load scenario indicator value with time. The curve 404 illustrates the variation of the loading threshold value with time. Although FIG. 4 illustrates that the loading threshold value remains substantially constant, it should be noted herein that in some embodiments there is no requirement that the loading threshold value remains constant. In some embodiments, the loading threshold value may vary depending on the wind speed and the yaw error. At point 406 in FIG. 4, the load scenario indicator value exceeds the loading threshold. Hence, point 406 in FIG. 4 is indicative that the wind turbine is loaded beyond the safe limit. It should again be noted that the curves of FIG. 4 are purely for the purpose of illustration and the embodiments presented herein may operate without generating said curves.

Figure 5:
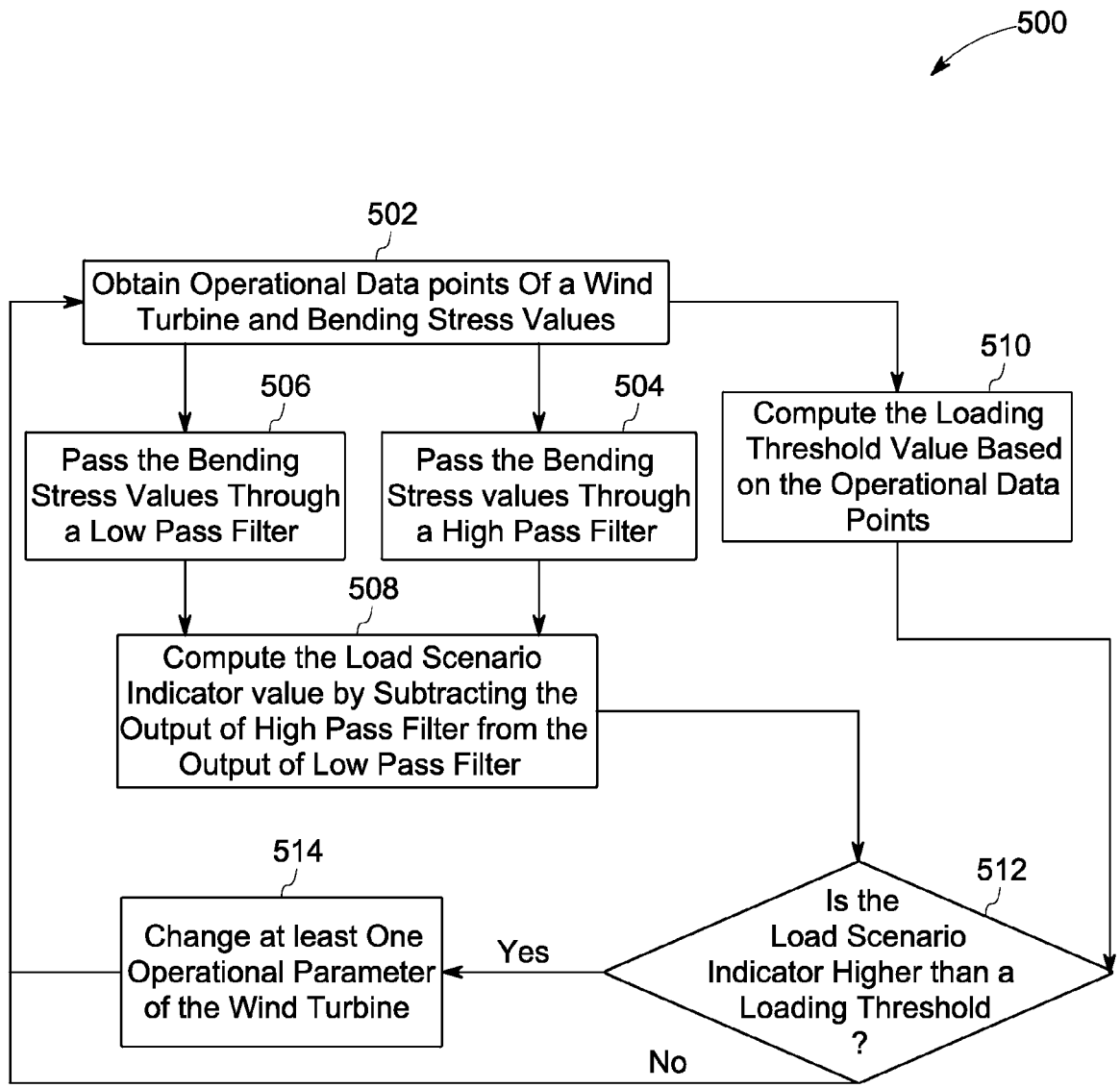
FIG. 5 illustrates a flow chart of a method for operating the wind turbine; according to one embodiment.

FIG. 5 illustrates a flow chart of a method 500 of operating the wind turbine according to one embodiment. The method 500 includes step 502 for obtaining the set of operational data points from the sensor module. As mentioned earlier, the set of data points may be measured at predetermined intervals of time over a fixed time window. Each point in the set of operational data points may include values such as torque on the rotor shaft, power generated by the wind turbine, rotational speed of the wind turbine, bending stress values on the rotor shaft, wind direction, wind speed, output voltage and output current of the turbine generator and the like.

In step 504 of the method 500, the set of high pass filtered bending stress values are obtained corresponding to the measured bending stress values. The set of high pass filtered bending stress values are obtained by applying the high pass filter to the measured bending stress values. In step 506, a set of low pass filtered bending stress values are obtained from corresponding measured bending stress values via the low pass filter. In one embodiment, at least one of the high pass filter and the low pass filter is a moving average filter. In an example, a time window of the low pass filter varies between 0.5-3 seconds. Further, the time of the high pass filter varies between 2.5-15 seconds.

In step 508, the output of the low pass filter and the high pass filter are subtracted to obtain the load scenario indicator value. The step 508 may be executed by the subtractor. As mentioned earlier the load scenario indicator value is the measure of high frequency pulsating load on the turbine blades. Extreme values of the high frequency pulsating load may damage the turbine blades.

In step 510, the loading threshold value is computed. The loading threshold value may be computed based on wind speeds and the yaw error. The loading threshold value is the indicator of the upper limit of pulsating loads that the turbine blades may safely negotiate. In step 512, the loading threshold value is compared to the load scenario indicator value, so as to check whether the bending stress load on turbine blades is within permissible limits. It is noted herein that the load scenario indicator value in one embodiment is obtained from bending stress values on the rotor shaft. However, the load scenario indicator value may also be indicative of the loading on the turbine blades of the wind turbine.

Step 514 of the method 500 is executed only if an overload condition is detected. The overload condition refers to a condition wherein the load scenario indicator value exceeds the loading threshold value. In step 514, at least one operating parameter of the wind turbine is controlled to reduce the load scenario indicator value below the loading threshold value. The operating parameter may include the pitch angle of turbine blades, the yaw of the wind turbine or the like. Other parameters such as the torque on the rotor shaft, the power generated by the wind turbine may also be controlled. The controlling of the at least one operational parameter of the wind turbine in one example effects the load scenario indicator value reducing it below the loading threshold value.

In various embodiments discussed herein, the system 114 for operating the wind turbine 102 may be implemented as computer program. The computer readable instructions may be embodied into a non-transitory computer readable medium such as a magnetic storage disc, an optical storage disc, and so forth. Alternatively, the computer readable medium may be one of a Random Access Memory (RAM), Read Only Memory (ROM), Programmable Read Only Memory (PROM), Erasable Programmable Read Only Memory (EPROM) and the like. The coded instructions of the computer program product may include instructions for obtaining the set of operational data points and bending stress values of the rotor shaft from the sensor module 204, computing the load scenario indicator value 214 based on the bending stress values, operating the low pass filter 208 and the high pass filter 210 and the subtractor 212. The computer program may further have instructions for obtaining the loading threshold value 218 either stored in a storing device or by computing it on a real time basis based on material properties of the turbine blades 106, wind speed and yaw error. Instructions for operating the wind turbine 102 in a safe mode may also be included. The safe mode includes a condition wherein the load scenario indicator value 214 is lower than the loading threshold value 218. In a condition, wherein the load scenario indicator value 214 exceeds the loading threshold value 218, the computer program may have instructions for reducing the load scenario indicator value 214 by changing at least one operational parameter of the wind turbine 102.

Embodiments presented herein provide a method of operating the wind turbine 102 such that the blades of the wind turbine are protected from an overload condition arising out of high wind speeds. The embodiments presented herein provide a method of operating the wind turbine 102 in a safe mode particularly during overload conditions thereby preventing damage to turbine blades 106 and also maintaining continuity of power generation.

The present invention has been described in terms of several embodiments solely for the purpose of illustration. Persons skilled in the art will recognize from this description that such embodiments may be practiced with modifications and alterations limited only by the spirit and scope of the appended claims.

The invention claimed is:

1. A method of operating a wind turbine, the method comprising:
   sensing a set of operational data points of the wind turbine, wherein at least one data point in the set of operational data points comprises at least bending stress values of a rotor shaft of the wind turbine;
   computing a load scenario indicator value based on the bending stress values;
   estimating a loading threshold value based on the set of operational data points; and
   controlling the wind turbine so as to operate the wind turbine in a safe mode when the load scenario indicator value exceeds the loading threshold value.

2. The method of claim 1, wherein at least one data point in the set of operational data points comprises bending stress value of the rotor shaft, wind speed, yaw error, power generated by the wind turbine, rotational speed of the wind turbine, or combinations thereof.

3. The method of claim 2, comprising computing the loading threshold value based on the wind speed and the yaw error.

4. The method of claim 1, wherein computing the load scenario indicator value comprises:
   obtaining a set of high pass filtered bending stress values from the bending stress values;
   obtaining a set of low pass filtered bending stress values from the bending stress values; and
   computing a difference between the set of high pass filtered bending stress values and the low pass filtered bending stress values.

5. The method of claim 1, comprising operating the wind turbine in the safe mode by reducing the load scenario indicator value to below the loading threshold value.

6. The method of claim 5, comprising reducing the load scenario indicator value by changing at least one operational parameter of the wind turbine, wherein the at least one operational parameter comprises pitch angle of turbine blades, yaw of the turbine, rotational speed of a wind turbine generator, and torque of the rotor shaft.

7. A system for operating a wind turbine, the system comprising:
   a sensor module for sensing a set of operational data points of the wind turbine, wherein at least one data point in the set of operational data points comprises at least bending stress values of a rotor shah of the wind turbine;
   a load scenario estimator for computing a load scenario indicator value based on the bending stress values;
   a loading threshold estimator for estimating a loading threshold value based on the set of operational data points; and
   a protective module for controlling the wind turbine so as to operate the wind turbine in a safe mode when the load scenario indicator value exceeds the loading threshold value.

8. The system of claim 7, wherein the sensor module comprises a plurality of sensors for sensing the set of operational data points, wherein the at least one data point in the set of operational data points comprises bending stress value of the rotor shaft, wind speed, yaw error, power generated by the wind turbine, rotational speed of the wind turbine, or combinations thereof.

9. The system of claim 7, wherein the sensor module comprises at least one proximity sensor for sensing the bending stress values of the rotor shaft.

10. The system of claim 7, wherein the load scenario estimator comprises:
   a high-pass filter for obtaining a set of high-pass filtered bending stress values from the bending stress values;
   a low-pass filter for obtaining a set of low-pass filtered bending stress values from the bending stress values; and
   a subtractor for computing a difference between the set of high-pass filtered bending stress values and the low-pass filtered bending stress values.

11. The system of claim 7, wherein the loading threshold estimator is configured to compute the loading threshold value based on at least one of wind speed, and yaw error.

12. The system of claim 7, wherein the protective module comprises a comparator configured to compare the load scenario indicator value with the loading threshold value.

13. The system of claim 7, wherein the protective module is configured to operate the wind turbine in the safe mode by reducing the load scenario indicator value below the loading threshold value.

14. The system of claim 13, wherein the protective module drives a control system so as to reduce the load scenario indicator value by changing at least one operational parameter of the wind turbine, wherein the at least one operational parameter comprises a pitch angle of turbine blades, a yaw of the wind turbine, rotational speed of a wind turbine generator, and a torque of the rotor shaft.

15. The system of claim 13, further comprising a non-transitory computer readable medium comprising a program configured to instruct a processor-based system to compute the loading threshold value based on at least one of wind speed and yaw error.

16. A system comprising:
   a wind turbine comprising:
      a plurality of turbine blades; and a wind turbine generator coupled to the plurality of turbine blades via a gear system and a rotor shaft; and
   a device communicatively coupled to the wind turbine; the device comprising:
      a sensor module for sensing a set of operational data points of the wind turbine, wherein at least one operational data point in the set of operational data points comprises at least bending stress values of the rotor shaft;
      a load scenario estimator for computing a load scenario indicator value based on the bending stress values;
      a loading threshold estimator for estimating a loading threshold value based on the set of operational data points; and
      a protective module for controlling the wind turbine so as to operate the wind turbine in a safe operating mode when the load scenario indicator value exceeds the loading threshold value.

17. The system of claim 16, wherein the safe mode comprises operating the wind turbine such that the load scenario indicator value is lower than the loading threshold value.

* * * * *